United States Patent [19]
Maurer

[11] Patent Number: 4,628,724
[45] Date of Patent: Dec. 16, 1986

[54] METER PROVERS

[75] Inventor: Robert Maurer, Middlesex, Great Britain

[73] Assignee: Skeltonhall Limited, Sheffield, England

[21] Appl. No.: 551,980

[22] PCT Filed: Feb. 16, 1983

[86] PCT No.: PCT/GB83/00047
§ 371 Date: Oct. 13, 1983
§ 102(e) Date: Oct. 13, 1983

[87] PCT Pub. No.: WO83/02825
PCT Pub. Date: Aug. 18, 1983

[30] Foreign Application Priority Data

May 13, 1982 [GB] United Kingdom ............... 8204529
Jun. 29, 1982 [GB] United Kingdom ............... 8212883
Jun. 29, 1982 [GB] United Kingdom ............... 8218825

[51] Int. Cl.⁴ .............................................. G01F 25/00
[52] U.S. Cl. ........................................................ 73/3
[58] Field of Search ............................................ 73/3

[56] References Cited

U.S. PATENT DOCUMENTS

| | | | |
|---|---|---|---|
| 3,492,856 | 2/1970 | Francisco | 73/3 |
| 3,998,089 | 12/1976 | Grove et al. | 73/3 |
| 4,152,922 | 5/1979 | Francisco | 73/3 |
| 4,372,147 | 2/1983 | Waugh et al. | 73/3 |
| 4,481,805 | 11/1984 | Dobesh | 73/3 |

Primary Examiner—Peter Chin
Attorney, Agent, or Firm—Wolf, Greenfield & Sacks

[57] ABSTRACT

A meter prover comprises a cylinder (16) having a proving bore (22) and enlarged end chambers (20). A piston (12) is mounted within the cylinder for movement along the bore in sealed engagement therewith, the axial length of the piston exceeding that of the enlarged end chamber. When the piston is at rest in the end chamber, fluid can pass through a continuously open passage in the piston. This passage preferably takes the form of apertures (24) in an annular wall portion (36). When the piston is moved out of the end chamber, flow through the passage is no longer possible and the piston continues in synchronism with the fluid flow. At the end of the proving run, the progressive closing of the apertures provides a fluid damping effect to arrest the piston.

10 Claims, 5 Drawing Figures

METER PROVERS

This invention relates to meter provers for use, for example, in proving rotary flowmeters of the type producing an electrical output pulse per increment of rotation. The number of pulses per unit volume is a characteristic of the meter which is defined as the k factor and it is the purpose of the prover to enable calibration of the meter k factor. A principal application is the measurement of oil flow rates and it is here a requirement for the meter k factor to be determined to an accuracy of at least 0.02%.

The conventional form of meter prover utilizes the passage of a sphere along an accurately dimensioned pipe between fixed detectors to displace a known volume of fluid. The volume of fluid displaced by the prover passes in series through the meter to be proved and the number of pulses generated in the meter during the passage of the sphere between the detectors is counted to enable determination of the k factor. To achieve the necessary high accuracy, a large displaced volume is essential and provers of 20 meters in length are not uncommon.

Proposals have been made to reduce the size of meter provers by using piston and cylinder arrangements and by reducing inherent inaccuracies in the prover to the extent that large displaced fluid volumes are no longer necessary. Significant improvements in inherent accuracy have been achieved through the use of electronic pulse handling techniques. Thus, in one example, pulse interpolation techniques are used to "inject" a train of uniformally spaced pulses between each pulse generated in the rotary meter undergoing proving. In this way, it is possible to compare the known volume displaced by the meter prover not merely with the number of whole pulses provided by the rotary meter but also with the number of interpolated pulses representing "fractions" of meter pulses.

A second known technique for improving accuracy is concerned to deal with the fact that through irregularities in the meter turbine, equal increments of rotation may not necessarily be associated with equal displaced fluid volumes. To remove this possible source of inaccuracy, the proving run is defined not by fixed points in the cylinder but by the receipt of meter pulses. In this way it can be arranged that the proving run covers an integral number of rotations of the meter turbine. With this technique, the piston displacement becomes a variable and must be measured with a suitable length encoder.

To enable advantage to be taken of the theoretical improvements in accuracy offered by such techniques, great care must be taken to ensure that the volume measured as displaced by the prover (whether a constant volume or variable) is identical with that flowing through the meter being proved. It is essential that there should be no leakage past the piston in the proving run and also that the proving run should be initiated under steady flow conditions and in such a manner as admits of complete reproduceability of results, within of course the constraints of unavoidable random errors.

Because of the need to have steady flow conditions, it is desirable for flow to be established through the cylinder of the prover before the piston is launched on a proving run. Various proposals have been made to this end and attention is drawn in particular to the following prior art.

U.S. Pat. No. 3,492,856
French published application No. 2471590
British patent specification No. 2023295B
French published application No. 2481449
British published application No. 2088566

The above documents evince the improvements in theoretical accuracy achievable through pulse techniques as described above but are of primary relevance here in connection with their disclosure of different methods for launching a prover piston.

In U.S. Pat. No. 3,492,856, the piston is provided with a through aperture on the axis of the piston. A valve is provided in this aperture which is normally open to enable a flow to be established through the piston when the piston is at rest; the valve being closed to initiate a proving run. A similar approach is adopted in FR No. 2 471 590 and GB No. 2 023 295B. Whilst this approach can be made to work satisfactorily, the complexity of the piston construction and the presence of moving parts within the piston increases the difficulty of ensuring that there is no leakage past the piston in the proving run. Moreover, any leakage that does occur is likely to remain undetected. In FR No. 2481449, a solid piston is employed with the cylinder having at each end a ring of axially extending slots. In the rest positions, the piston is disposed among the slots with the result that flow can pass around the piston into the bore. Initial movement of the piston takes it away from the slots and movement of the piston thereafter is in synchronism with flow through the bore. By the use of a symmetrical piston and the provision of slots at both ends of the cylinder bore, a bi-directional prover is obtained. To ensure that there is no leakage past the piston in the proving run, the piston carries a pair of O-ring seals which are under compression in the radial direction when the piston is in the main portion of the cylinder bore. With the piston in either of its rest positions, the O-ring seals will contact the slots in the cylinder wall. There will be local deformation of each O-ring as its relaxes outwardly at the slots. This local deformation will on repeated use of the prover lead to degradation of the seals and to increased risks of leakage. Furthermore, the piston is necessarily of small axial dimension with the result that great care must be taken to prevent twisting of the piston relatively to the cylinder in a proving run.

GR No. 2 008 566 discloses a cylinder having a proving bore with an end chamber at each end, the diameter of the end chamber exceeding that of the bore. At the beginning and end of a proving run, the piston is received in the end chamber enabling flow around the piston. When the piston lies in one of the enlarged end chambers, it is no longer aligned through its engagement with the cylinder bore and separate means must be provided to maintain alignment. This introduces a further perturbation into the flow through the cylinder and unless great care is taken, some slight re-alignment will still occur each time the piston enters the bore. Such re-alignment will impose unwanted strains on the prover and hasten the loss of seal integrity.

It is an object of one form of this invention to provide an improved meter prover in which the above described disadvantages can be avoided.

Accordingly, the present invention consists in one aspect in a meter prover comprising a cylinder having a proving bore and an end chamber of a diameter exceeding that of the bore, the end chamber communicating with a fluid port for connection to a meter to be proved; a piston mounted in the cylinder for movement along the bore in sealed engagement therewith and being receivable in said end chamber to permit fluid flow past the piston in a rest position, characterised in that the piston has an axial dimension exceeding that of the end chamber and that continuously open passage means are provided in the piston enabling flow through the piston between the end chamber and the bore, when the piston is in said rest position.

Advantageously, the passage means comprises at least one aperture disposed in the circumference of the piston communicating with an opening in the piston end face adjacent the proving bore.

Suitably, annular sealing means are provided circumferentially of the piston, said aperture lying between the sealing means and the proving bore.

Preferably, the piston comprises an annular wall portion coaxial with the bore and defining said opening in the piston end face adjacent the bore, said aperture being formed in the wall portion.

It will be appreciated that as the piston according to this aspect of the invention is of an axial dimension exceeding that of the end chamber, the piston is continually aligned within the bore. Strictly coaxial movement of the piston relatively to the cylinder is therefore assured.

As the piston begins to move into the proving bore wall of the cylinder, the proportion of each aperture remaining in the end chamber and thus available for flow through the piston, is progressively reduced. In this way, there is a smooth acceleration of the piston into the proving run. Similarly, at the end of the proving run the proportion of each aperture which is open to the end chamber will increase as the piston enters the end chamber. The pressure exerted by the fluid upon the piston will therefore reduce smoothly. In a preferred form of the invention, fluid trapped in a cylinder end portion in advance of the piston is exhausted through the passage means in the piston to the end chamber. As the piston moves towards the rest position, the proportion of each aperture available for such exhaust flow will reduce. The apertures can thus together be regarded as an orifice through which fluid trapped in the end portion is throttled, the effective orifice area being steadily reduced. In this way there is a steadily increasing force bringing the piston to rest.

In GB No. 2088566 the described piston is provided with two circumferentially extending seals between which and the cylinder bore is defined an annular chamber. A channel in the piston communicates between this annular chamber and an external pressure sensor for the purpose of checking the integrity of the seals. It will be understood that when the piston is in the enlarged end chamber, the space between the piston seals is exposed to the fluid pressure in the bore. Accordingly, when the piston enters the bore the fluid pressure in the annular chamber between the seals will be the same or closely similar to that in the cylinder bore. Under these circumstances, any leakage past the seals which is not extreme is unlikely to result in a measurable pressure change.

It is an object of a further form of this invention to provide an improved meter prover in which any fluid leakage past the piston can be detected.

Accordingly, a further form of this invention is characterised in that means are provided for establishing, after initial movement of the piston from its rest position, a fluid pressure differential between the bore and the annular chamber defined between the two piston seals. In this way, any leakage past one or other of the seals will be detected as a loss of pressure differential.

The invention will now be described by way of example with reference to the accompanying drawings in which.

Figure 1:
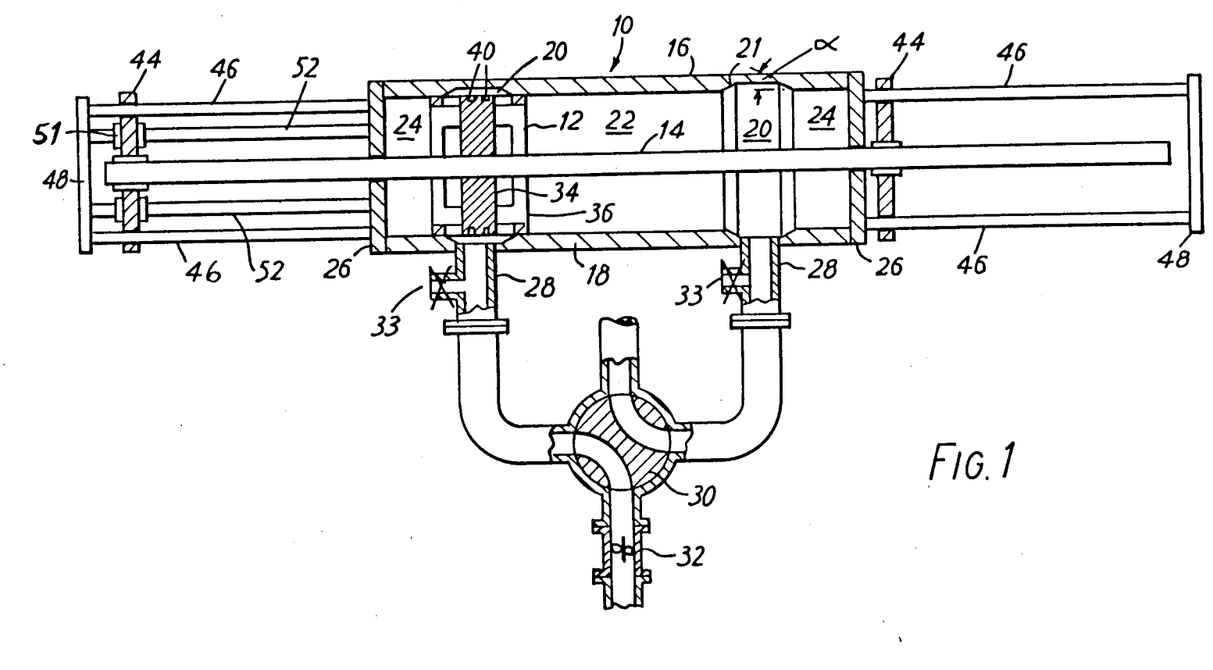
FIG. 1 is a diagrammatic sectional view of a meter prover according to this invention.

Referring first to FIG. 1, the meter prover shown generally at 10 comprises a piston 12 rigidly mounted on a piston rod 14 for movement within a cylinder 16. The cylinder is formed with a relatively thick wall 18 having towards each end thereof an annular groove in its interior surface defining a chamber 20 of enlarged diameter. The groove is bounded by faces 22 inclined at an angle $\alpha$ to the cylindrical axis. Between the enlarged chambers, the cylinder is of constant internal diameter providing a proving bore 22. Outwardly of each enlarged chamber, an arresting portion 24 of the cylinder has the same diameter as the proving bore, these end portions being closed with cylinder caps 26. The two enlarged chambers 20 communicate with respective fluid ports 28 through which the cylinder is connected with a four way valve 30. In known manner, the four way valve can be used to connect the cylinder in series with the flowmeter (shown schemmatically at 32) for movement of the piston 12 in either direction relatively to the cylinder. Calibration take-off ports 33 are provided to enable the volume displaced by the piston to be collected and measured for calibration of the prover.

Figure 2:
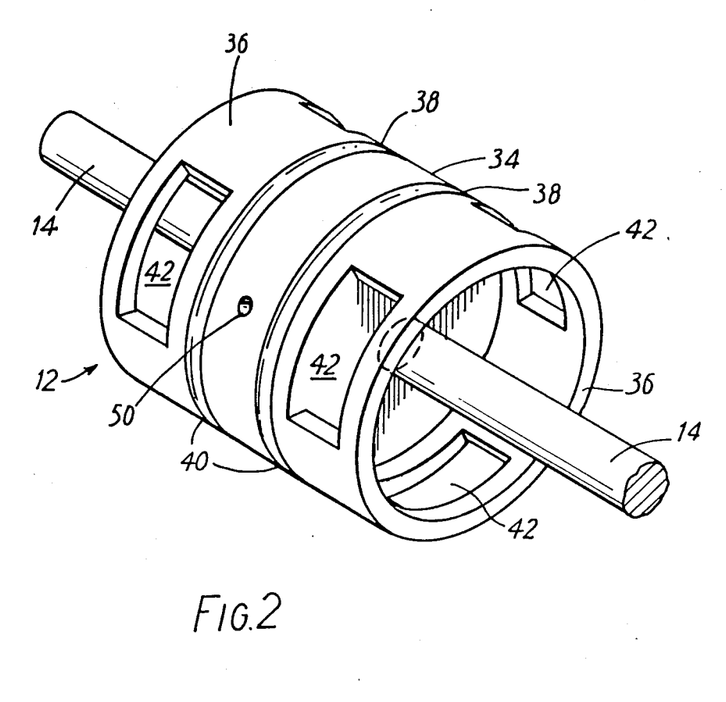
FIG. 2 is a perspective view of the piston shown in FIG. 1.

Referring additionally to FIG. 2, the piston 12 comprises a central disc portion 34 from which integral and annular wall portions 36 extend in opposite directions. Within the central portion 34 the piston is provided with circumferential grooves 38 which receive O-ring seals 40. Each annular wall portion 36 is formed with a series of three rectangular apertures 42 which are equiangularly spaced about the circumference of the piston.

Externally of the cylinder, the piston rod 14 carries two sliders 44, one each side of the cylinder. These sliders cooperate with fixed alignment rods 46 which extend in opposite directions from the cylinder and have there free ends anchored in plates 48. The left hand slider 44 carries a head 50 which cooperates with a pair of linear encoders 52 extending from the cylinder to the left hand plate 48, parallel with the piston rod. The arrangement of linear encoders will be described more fully hereinafter.

When the piston is in the rest position shown in FIG. 1, fluid can pass radially of the piston from the end chamber through the apertures 42 and then axially outwardly through the opening defined by the end of the wall portion 36. At the start of the proving run, the piston is moved to the right as shown in FIG. 1. During this movement, the proportion of apertures 42 available for flow through the piston is progressively reduced until seals 40 engage the bore, whereupon further flow past the piston is prevented and the piston is carried forward in synchronism with the fluid flow through the cylinder.

By this means, a steady flow can be established in the cylinder, with the piston in a rest position yet still axially aligned within the cylinder. As the piston is moved away from its rest position to initiate a proving run, the proportion of the flow that "by-passes" the piston seals is progressively reduced so that a steadily increasing fluid pressure is applied to the piston. As the piston is continually aligned within the cylinder, engagement of the seals within the proving bore causes the minimal perturbation to the flow.

At the end of the proving run, the piston will enter the enlarged chamber 20 at the opposite end of the cylinder. The two sets of apertures in the piston then serve differing functions. As soon as the seals 40 enter the enlarged chamber, some flow is possible through the open end of the left hand annular wall portion and radially outward of the apertures 42. Initially, the proportion of each aperture available for such flow is small but this increases as the piston moves to the right until the full area of the apertures is used. In this way, the fraction of the flow which is permitted to pass through the piston increases steadily from nil, when the piston is still in the providing bore, to unity, when the piston is in the rest position. It follows that the fluid pressure acting upon the piston is reduced steadily from a maximum to a minimum.

Considering now the fluid trapped to the right of the piston in arresting portion 24, this will be forced out through the right hand apertures 42 as the piston moves to its rest position. Initially, the full area of the apertures is available for this exhaust flow but the effective area is steadily decreased as the piston moves to the right. The effect is that the fluid trapped in the end portion of the cylinder is throttled through an orifice, the effective area of which is steadily decreased. As a result, the trapped fluid has a progressively increasing damping affect upon the piston causing it to be brought smoothly to rest without imparting a fluid shock wave to pipes associated with the prover or damaging itself on the end cap 26. The rate of deceleration will be dependent upon the geometry of the apertures 42; the angle $\alpha$ at which the cylinder bore opens to the enlarged end chamber 20 and the fluid viscosity. The first two factors will be chosen in the design of the prover to produce the desired deceleration characteristic.

In a modification (not illustrated) the apertures in the piston wall take the form of slots opening to the circular wall edge. In another modification, the described three apertures are replaced by a larger number of apertures having a smaller circumferential dimension. The aggregate aperture area remains preferably equal to or greater than the cross sectional area of the fluid port 28. It is highly desirable that each aperture should be of significant axial extent in order to achieve the discussed smooth launching and arresting. Each aperture should preferably occupy 30% or more of the length of the associated piston half, or 15% of the total piston length. It should be recognised that whilst the use of an annular piston wall portion with circumferential apertures is preferred, other forms of passage means could be provided communicating between an aperture in the piston circumference and an opening in the piston end face; for example a drilled bore in a solid piston.

The enlarged chambers 20 in the cylinder can be formed otherwise than by cutting an annular groove in a thick walled cylindrical tube. The cylinder could for example be fabricated from relatively thin section material with a central portion of a first diameter, chamber portions of a second, increased diameter and intermediate connecting sections of truncated conical form. The interior of such a fabricated cylinder could be coated with phenolic resin or the like to provide the necessary smooth bore.

Figure 3:
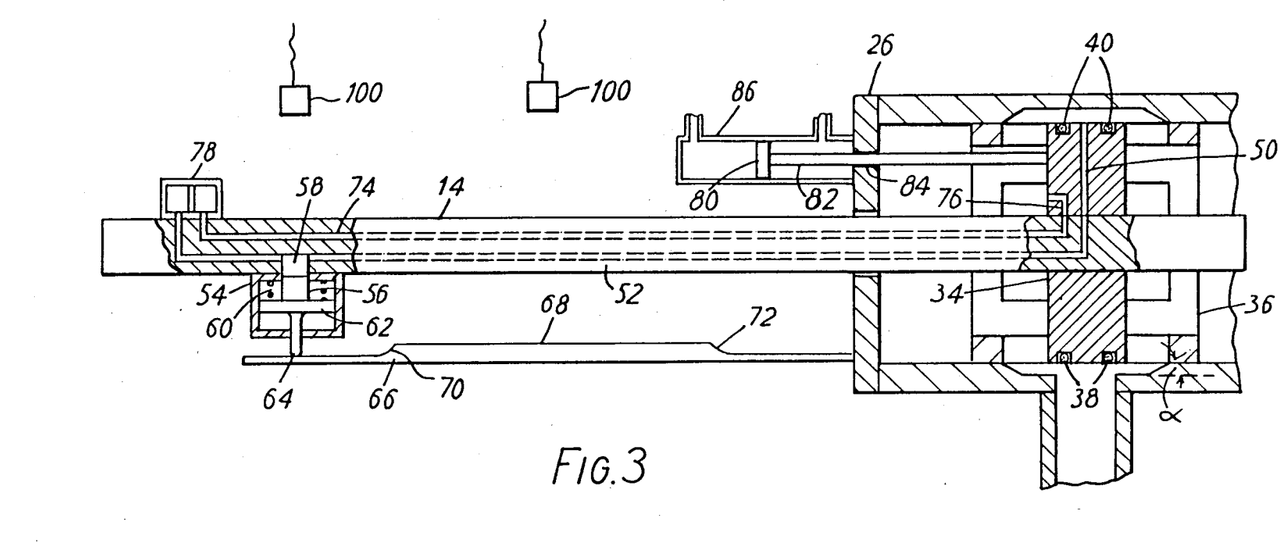
FIG. 3 is a diagrammatic section view of a detail of the prover shown in FIG. 1.

Reference is now made to FIG. 3 which shows certain details of the prover of FIG. 1.

Between the two piston O-ring seals 40 there is formed a channel 50 extending radially of the piston and connecting with a first axial bore 52 in the piston rod 14. Remotely from the piston, the piston rod carries a housing 54 supporting a plunger 56 which cooperates with a cavity 58 in the piston rod, this cavity opening to the bore 52. A compression spring 60 acts between the housing and a flange 62 formed on the plunger urging a finger 64 of the plunger into engagement with a fixed track 66 extending in parallel with the piston rod. The fixed track includes a raised portion 68 bounded by shoulders 70 and 72.

A second bore 74 in the piston rod communicates at the inner end with a passage 76 opening to the interior of the cylinder. Outwardly of the plunger 56, the piston rod carries a differential pressure transducer 78 having ports connected respectively with the bores 52 and 74.

A launching piston 80 is mounted at the side of the cylinder and has a piston rod 82 extending through an aperture 84 in the cylinder end cap 26 so as to engage the central disc portion 34 of the main piston. The launching piston 80 is mounted within a pneumatic cylinder 86 of the double acting type. In a modification, the launching piston is arranged to act upon the piston rod, externally of the cylinder.

With the piston in the rest position shown in FIG. 3, the pressure will be equal at both ports of the pressure transducer 78. As the launching piston 80 is actuated to initiate a proving run, the finger 64 of the plunger will ride over track 66 with the plunger remaining initially in its outer position. After both seals 40 have entered the proving bore, finger 64 will encounter the shoulder 70 of track 66 urging the plunger upwards and increasing the fluid pressure within bore 52 and within the annular space between the two seals. The pressure transducer 78 will then measure the difference between this increased pressure and the cylinder pressure as present in bore 22. Provided that there is no leakage past either of the seals 40, this pressure differential will remain throughout the proving run, disappearing only as finger 64 passes the second shoulder 72 of the track and the seals 40 enter the enlarged chamber at the opposite end of the cylinder. Any leakage past the seals during the proving run will be immediately detectable as a decay in the differential pressure detected by transducer 78.

The imposition of an increased pressure difference across the seals, ensures that even slight leakage is detectable. The use of a transducer measuring a differential pressure, rather than the absolute fluid pressure in the space between the two seals, further helps to improve the sensitivity of the check against leaks.

In a modification, means other than the described plunger could be employed to establish the desired pressure differential across the seals. A remotely operable solenoid could be employed for example and, moreover, a negative rather than a positive pressure change could be used.

Figure 4:
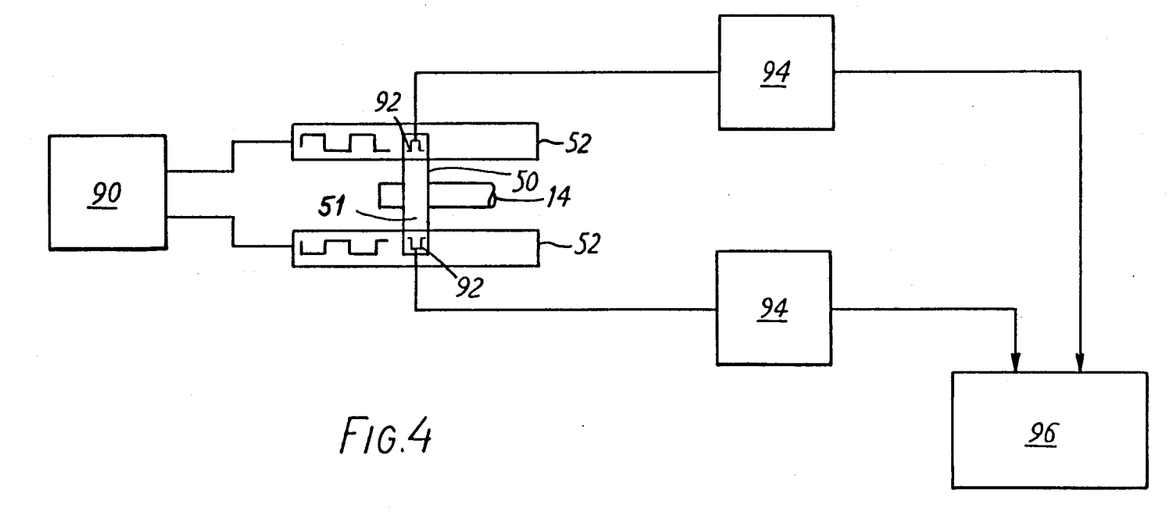
FIG. 4 is a diagram illustrating the length encoding system of the prover shown in FIG. 1.

Referring now to FIGS. 1 and 4, piston rod slider 44 carries a head 51 which tracks over two parallel linear encoders 52. The individual encoders are of known form comprising a square-wave winding which is energised from excitation circuit 90. According to this form of the invention, two encoders are provided, the windings of which are 180° out of phase in space. The head carries two head windings 92 associated one with each of the encoders, the arrangement being such that a voltage is generated in the winding having a substantially sinusoidal dependence upon piston displacement. The outputs of the two windings are fed to corresponding pulse shapers 94 which produce pulse trains having a frequency equal to that of the sinusoidal winding voltage. The pulse trains are fed to a processing unit 96.

Figure 5:
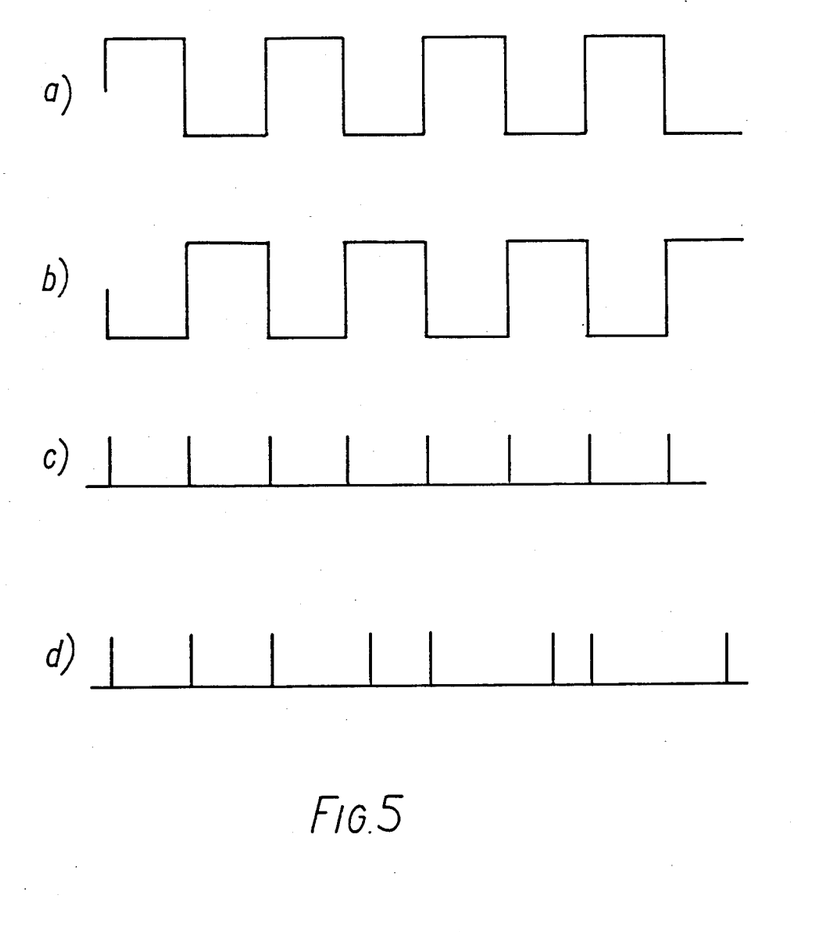
FIG. 5 is a diagram showing pulse outputs from certain parts of the system illustrated in FIG. 4.

In a conventional, single length encoder of this type, output pulses are counted to provide an indication of displacement from a datum point. According to this form of the invention, pulses are counted alternately from the two encoders. Referring to FIG. 5, graphs (a) and (b) show respectively the outputs of pulse shapers 94. Graph (c) shows the result of leading edge triggers counter operating on the combined pulse trains. The first count is associated with pulse train (a), the second count with pulse train (b) and so on. It will be seen that in this way the spatial resolution is doubled for a particular encoder winding and also the maximum frequency response. It may be difficult to achieve a single winding with the necessary resolution and frequency response so that this aspect of the invention is of considerable importance. Of course phase differences of other than 180° between the two encoders can be employed and, indeed, more than two encoders can be applied. With n encoders, a pulse difference of $\pi/n$ would be convenient.

In addition to increasing the resolution and frequency response, the use of two or more encoders provides detector security in the sense that an error in any one encoder will be apparent. With reference to graph (d), it will be seen that drift in the encoder associated with pulse train (b) introduces non-uniformity in the counter output which through suitable logic can be detected. The drift may be due to temperature variations or to damage and errors other than drift can similarly be detected. With regard to temperature variations, two encoders can usefully be arranged to have different thermal characteristics.

The provision of length encoders enables the described meter prover to be used in the variable volume mode described previously, that is to say with the beginning and end of the proving run defined by pulses from the meter. The prover can also be used in a constant volume mode with the number of meter pulses counted (preferably with pulse interpolation) during the passage of the piston between fixed detectors 100. These detectors may be photoelectric in nature or even be incorporated in one of the length encoders in the form of local irregularities of the winding. In the constant volume mode the length encoders provide the useful facility of enabling a continuous comparison to be made between rotational velocity of the meter rotor and linear velocity of the piston. Any short term variation in rotor velocity which is not mirrored by a corresponding variation in piston velocity may indicate a meter error, for example juddering or sticking of the rotor. The continuous comparison also enables compensation to be made for the momentary extra drag imposed on the meter rotor by the launching of the piston. The length encoder or encoders further enable a check to be made against seal leakage by direct measurement of piston displacement for a known fluid volume from, for example, a standard meter.

As will be appreciated, it is possible to use forms of encoder other than that specifically described. For example, encoders are available in which the winding excitation is time dependent so that an absolute position signal can be generated, removing the need to count pulses from a datum position. Further, the encoder may take other physical forms, an optical grating being one example. Whilst a parallel arrangement of two linear encoders is to be preferred since it enables mounting of the encoder head upon the piston rod, other arrangements are possible; examples being an arrangement of one linear encoder at each end of the cylinder or coaxially mounted rotary encoders.

I claim:

1. A meter prover comprising a cylinder having a cylindrical proving bore and a cylindrical end chamber which is coaxial with the proving bore and of a larger diameter than that of the proving bore, the end chamber and the proving bore being contiguous; a fluid port communicating with the end chamber for connection externally of the prover with a meter to be proved; a piston mounted in the cylinder for movement along the bore in sealed engagement therewith in synchronism with fluid flow through the prover in a proving run, the piston being receivable in said end chamber in a rest position, the axial dimension of the piston exceeding that of the end chamber such that in said rest position at least a portion of the piston remains in engagement with the proving bore, there being provided a continuously open passage extending between at least one aperture disposed in the circumference of the piston and an opening in the piston end face adjacent the proving bore, said at least one aperture lying within the end chamber in said rest position of the piston so that fluid may pass through the piston along said passage in the rest position.

2. A meter prover according to claim 1, wherein the or each aperture is of substantial axial extent, such that permitted flow through said passage decreases steadily to nil over an initial piston movement away from said rest position.

3. A meter prover according to claim 1, wherein the piston comprises an annular wall portion coaxial with the bore and defining said opening in the piston end face adjacent the bore, said aperture being formed in the annular piston wall portion.

4. A meter prover according to claim 3, wherein a plurality of apertures are provided equiangularly spaced about the circumference of said annular wall.

5. A meter prover according to claim 1, wherein the cylinder is proved with a further end chamber of a diameter exceeding that of the bore at the opposite end of the proving bore, and a further fluid port communicating with said further end chamber, the piston being provided with like passages at both ends thereof enabling movement of the piston away from rest positions at either end of the cylinder.

6. A meter prover according to claim 5, wherein the cylinder is provided outwardly of each end chamber with an arresting portion of the same diameter as the proving bore such that upon movement of the piston toward one arresting portion, fluid in that arresting portion is expelled through the corresponding passage means.

7. A meter prover according to claim 5, wherein said piston comprises a central sealing portion provided with annular sealing means and annular wall portions extending from respective ends thereof coaxially of the bore, there being formed apertures in each wall portion.

8. A meter prover according to claim 7, wherein the or each aperture in each wall portion occupies 15% or more of the axial extent of the piston.

9. A meter prover comprising a cylinder having a cylindrical proving bore and a cylindrical end chamber which is coaxial with the proving bore and of a larger diameter than that of the proving bore, the end chamber and the proving bore being contiguous; a fluid port communicating with the end chamber for connection externally of the prover with a meter to be proved; a piston rod; a piston carried on the piston rod and mounted in the cylinder for movement along the bore in sealed engagement therewith a synchronism with fluid flow through the prover in a proving run, the piston being receivable in said end chamber in a rest position to permit fluid flow past the piston; a pair of circumferentially extending seals provided on the piston and defining with the piston and the proving bore an annular chamber; first channel means in the piston communicating with said annular chamber; second channel means in said piston rod communicating with said first channel means; fluid pressure sensing means communicating with said second channel means for monitoring fluid leakage past the seals; fixed camming means positioned alongside the piston rod; and a pressurizing mechanism carried on the piston rod in fluid communication with said second channel means and actuable by said fixed camming means to establish after initial movement of the piston away from said rest position a fluid pressure differential between said annular chamber with the proving bore.

10. A meter prover according to claim 9 wherein there is provided in said piston rod third channel means communicating with the bore of the cylinder, said fluid pressure sensing means comprising a differential pressure sensor having inputs connected respectively with said second channel means and said third channel means.

* * * * *